(No Model.) 5 Sheets—Sheet 1.
R. EICKEMEYER.
METHOD OF OPERATING OR CONTROLLING ELECTRIC MOTORS OR DYNAMOS.
No. 531,790. Patented Jan. 1, 1895.
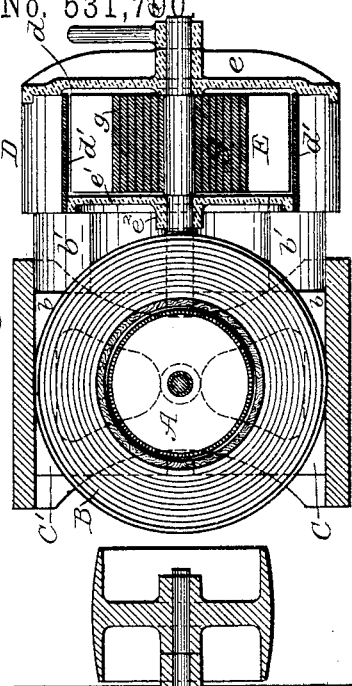
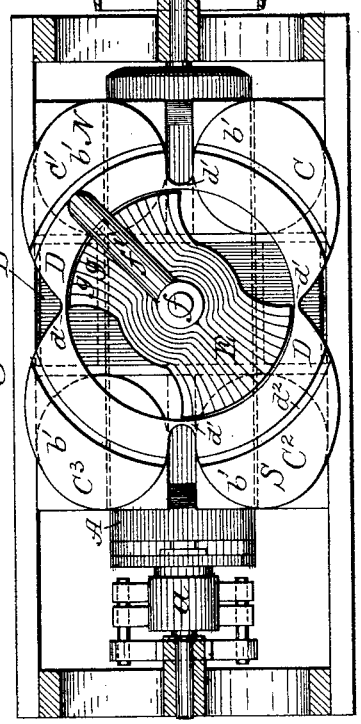
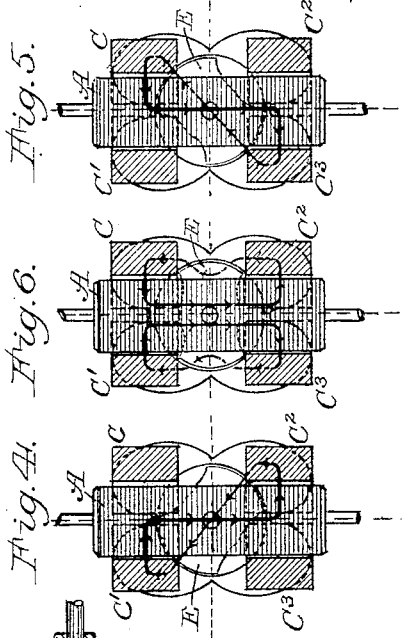
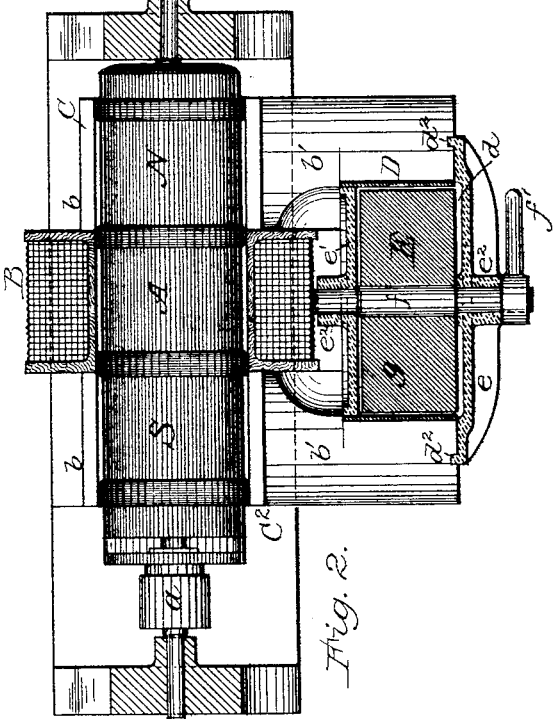
Attest:
Philip F. Larner
Howell Little
Inventor:
Rudolf Eickemeyer
By Wm C Wood
Attorney (No Model.) 5 Sheets—Sheet 2.
R. EICKEMEYER.
METHOD OF OPERATING OR CONTROLLING ELECTRIC MOTORS OR DYNAMOS.
No. 531,790. Patented Jan. 1, 1895.
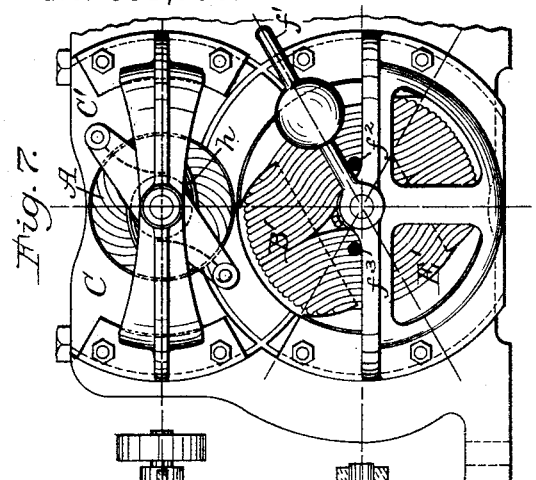
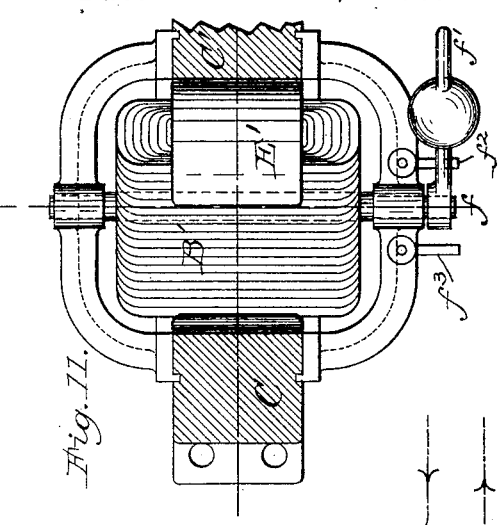
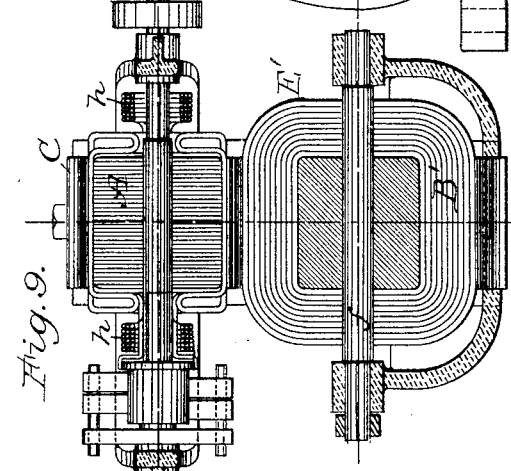
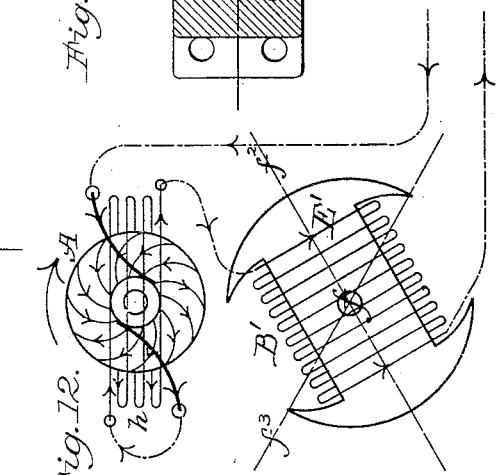
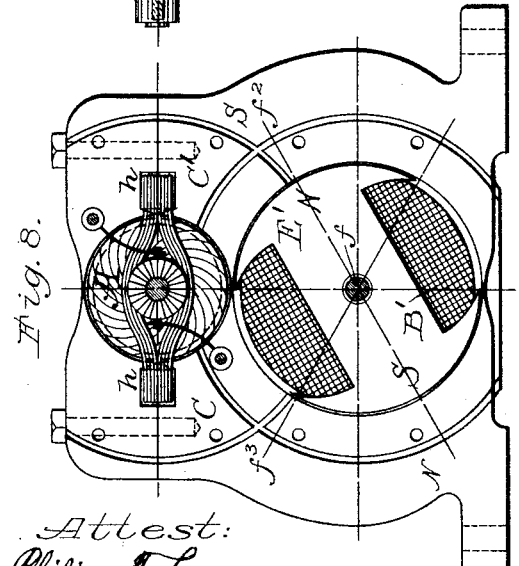
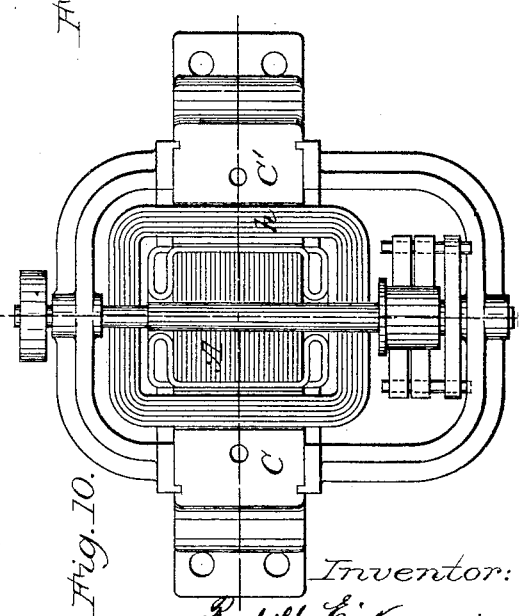
Attest:
Philip F. Turner
Lowell Bartle
Inventor:
Rudolf Eickemeyer
By his Attorney

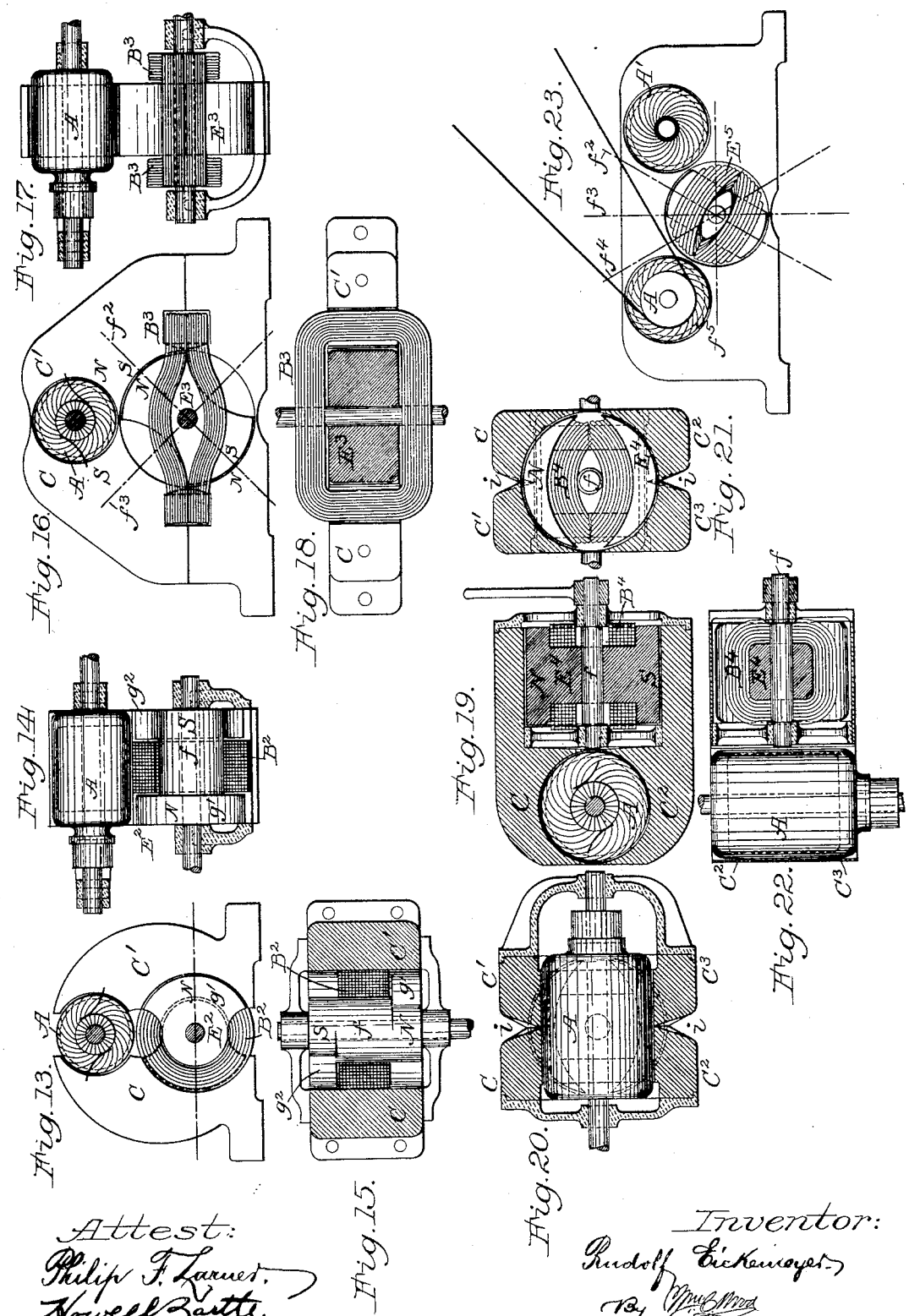

(No Model.) 5 Sheets—Sheet 4.
R. EICKEMEYER.
METHOD OF OPERATING OR CONTROLLING ELECTRIC MOTORS OR DYNAMOS.
No. 531,790. Patented Jan. 1, 1895.
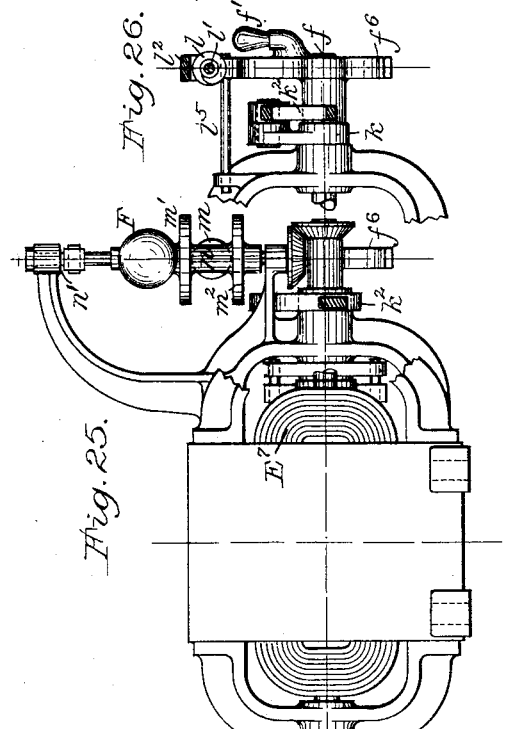
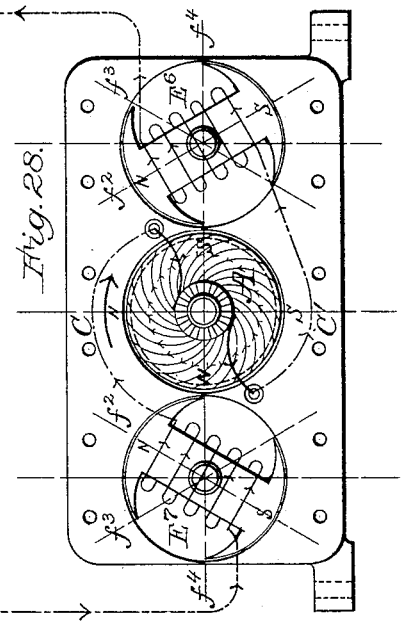
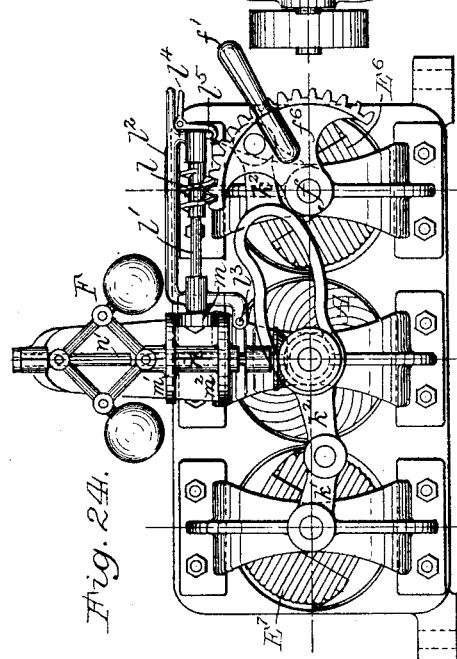
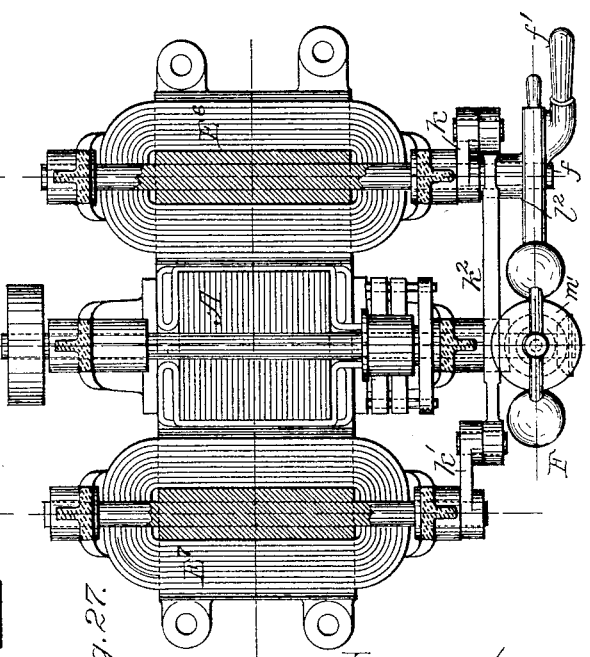
Attest:
Philip T. Turner
Howell Little
Inventor:
Rudolf Eickemeyer
By M. C. Mord attorney (No Model.) 5 Sheets—Sheet 5.
R. EICKEMEYER.
METHOD OF OPERATING OR CONTROLLING ELECTRIC MOTORS OR DYNAMOS.
No. 531,790. Patented Jan. 1, 1895.
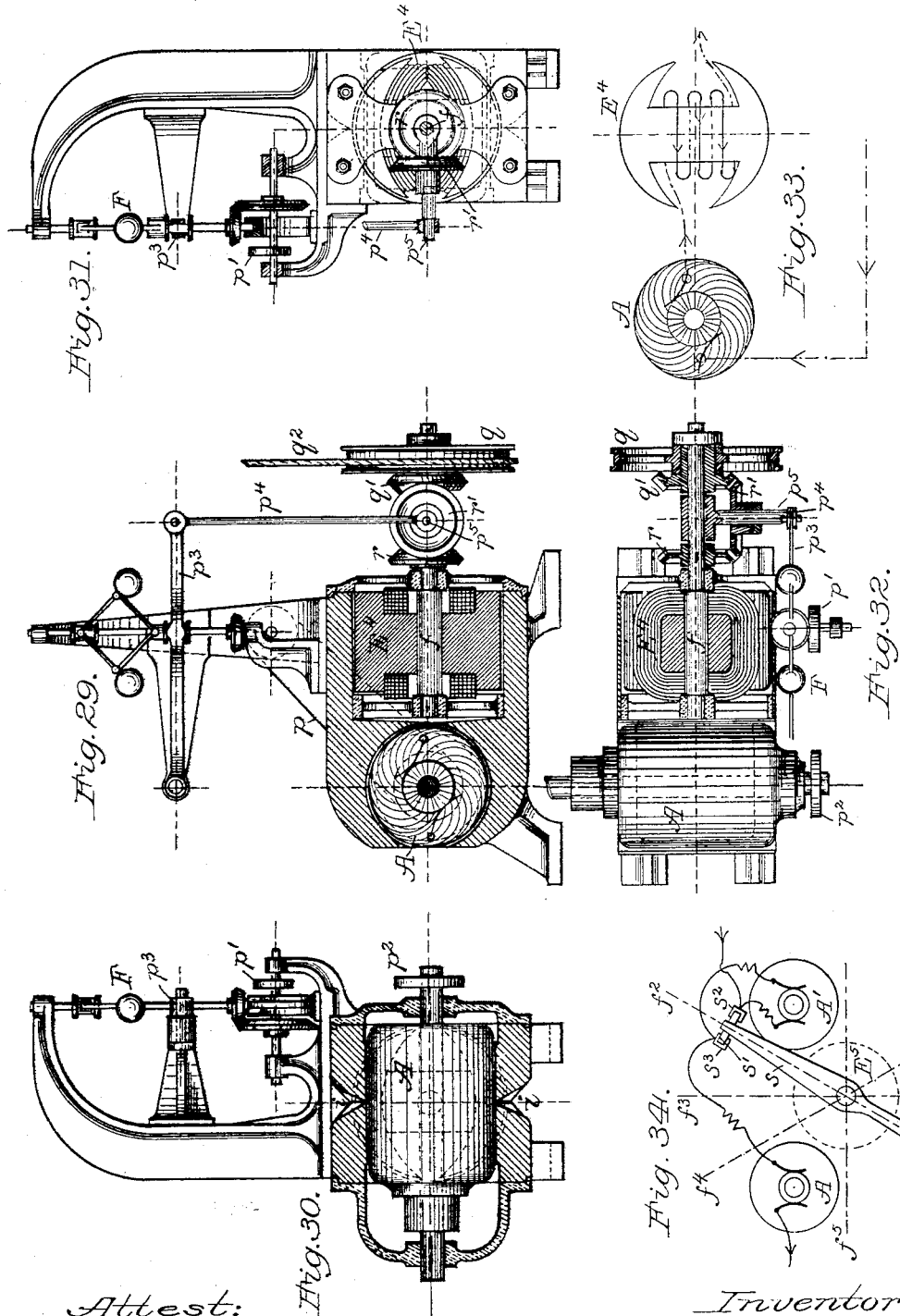

United States Patent Office.

RUDOLF EICKEMEYER, OF YONKERS, NEW YORK.

METHOD OF OPERATING OR CONTROLLING ELECTRIC MOTORS OR DYNAMOS.

SPECIFICATION forming part of Letters Patent No. 531,790, dated January 1, 1895.

Application filed November 2, 1891. Serial No. 410,702. (No model.)

*To all whom it may concern:*

Be it known that I, RUDOLF EICKEMEYER, of Yonkers, in the county of Westchester and State of New York, have invented a certain new and useful Method of Operating or Controlling Electric Motors or Dynamos, and also certain Improvements in Dynamo-Electric Machines, which enable them to be worked in accordance with my said novel method; and I do hereby declare that the following specification, taken in connection with the drawings furnished and forming a part of the same, is a clear, true, and complete description of my said invention.

My said novel method, or process, of operating or controlling electric motors, and dynamos, is of special value in connection with motors which in duty, require to be frequently started, stopped, and reversed, and as a result of my invention, motors may be controlled as to speed and power, and started, stopped and reversed, without in any manner varying the electric current supplied respectively, to the circuits of the armature, and the field coils, either as to strength, or direction. It is not new to merely vary the strength of a magnetic field in an electric motor, without varying the power or direction of currents in the electric circuits of the armature and field coils. This result has heretofore been reached, either by electrical means, or through the application of variable air space resistance, in and to the magnetic circuit of a motor, whereby the resistance in the magnetic circuit was increased or diminished, and the number of lines of magnetic force produced by the current, varied accordingly. Hence, if applied to service, only variations in speed in a motor, or in potential in a dynamo, were possible.

My said novel method, or process, of operating and controlling electric motors, and dynamos, enables me to regulate the potential of a dynamo, and also to control the speed, power and direction of rotation of a motor, by changing mechanically, the path in which the magnetic current flows in the magnetic circuit of the machine without any change in the electric circuits, and at the same time, without any change in the strength of the magnetic current.

I believe I am the first to discover, that the magnetic current produced by the field coils of a dynamo or motor, can be switched as readily as an electric current, and that a dynamo or motor, can be as readily controlled by this method, as by the method heretofore employed, which involves complicated electric switching devices, for cutting the electric current out, or in, with respect of the field coils, or resistances, and reversing the direction of the current in either armature, or field, for reversing the direction of motion in a motor.

Various attempts have been made, to regulate the potential of a dynamo, and the speed of a motor, by the introduction of variable air resistance in the magnetic circuit of the machines, and thereby increasing, or decreasing, the number of lines of magnetic force passing through the movable part of the magnetic circuit of the dynamo or motor, and therefore in this kind of regulation, the magnetism tends to pull the movable iron element, employed in such magnetic circuits, to the position of least magnetic resistance; and the power required to move the movable magnetic element, and to keep it in its proper place, is so excessive in large machines, that special devices are necessary to work the mechanism.

In my method of regulation, or, as I will call it, magnetic commutation, the magnetic resistance in the magnetic circuit of the machine, is as nearly as possible, the same in all positions of my magnetic switch, whether it be a solid bar of iron, or laminated, to afford a larger magnetic resistance in the one direction than in the other. Now the exciting current in the field, not being changed for switching the motor, the magneto motive force, (*i. e.*, the whole amount of magnetism,) is the same in all the positions of the magnetic switch, and only its direction, with respect of the armature, is changed. The whole number of lines of magnetic force in the magnetic switch remaining constant, there is therefore no tendency of keeping the magnetic switch in a certain position of minimum resistance, but it remains stationary in any position, or when moving it, only the mechanical friction of its bearings has to be overcome, but no magnetic pull is exerted thereon, as in those devices which work by changing the magnetic resistance, for varying the strength of the magnetic current.

In my system of regulation, a movable element in the magnetic circuit, serves as a magnetic current conducting switch. In one position, it conducts the magnetic current through the armature in one direction. In another position it sends the magnetic current through the armature in the opposite direction. In another position, again, the magnetic current completes its circuit partly through the armature, and partly through other parts of the machine. In other words, a part of the magnetic current is shunted around the armature, and the quantity of useful or applied lines of magnetic force is diminished, but without change of the whole number of lines of magnetic force. In still another position, all the magnetic current produced by the field coils, is shunted around the armature, and no lines of magnetic force pass through the armature from cheek piece to cheek piece, so that no electromotive force is induced in the armature, and the motor comes to rest. In some of the machines shown in my drawings herewith, the same results are secured, by changing the direction of the magnetic current with regard to the armature, so that it flows through the armature in one direction for securing forward motion, and in the opposite direction for securing backward motion, or the current flows perpendicular thereto, thus inducing no electro motive force in the armature, and stopping the machine. In order to keep the line of commutation, and the brushes in the same position under all the varying conditions of load, speed, and direction of motion, I have shown in some of the machines, an independent counterfield coil, surrounding the armature, the magnetism of which combines with the armature magnetism, and the field magnetism, so that those armature coils passing under the brushes are inductionless.

For a motor intended to be fed with a constant difference of electric potential, I have combined with my magnetic reversing switch, an auxiliary armature, which starts when the working armature is stopped by the magnetic switch, and by its rotation produces counter electro motive force, and prevents thereby an undue rush of current through the motor, when not actually at work.

After describing in detail, the several electric motors embodying my invention, in various forms as illustrated in the drawings, the features deemed novel, and appropriate to this application, will be duly specified in the several clauses of claim, hereunto annexed.

Figure 1, illustrates mainly in side view, and partially in section, an electric motor, or dynamo, embodying the main features of my invention. Fig. 2, illustrates the same machine, in horizontal longitudinal section. Fig. 3, is a lateral central sectional view of the same. Figs. 4, 5, and 6, illustrate diagrammatically, the armature, the cheeks, the magnetic current switch or movable portion of the magnetic system, and indicate the variations in the magnetic circuits, incident to adjustments for inducing rotation in opposite directions, and also for neutralizing the magnetic field, the latter being shown in Fig. 6. Fig. 7, in end view, illustrates a motor of another form, embodying my invention, but having a magnetic switch which is in itself, an electro magnet, a portion of the frame at one side, being broken away. Fig. 8, illustrates the machine Fig. 7, with a portion of its end plates removed, and with the magnetic switch shown in section. Fig. 9, is a longitudinal vertical central section of said machine. Fig. 10, is a horizontal section of the same, in line with the armature shaft. Fig. 11, is a horizontal section, illustrating the magnetic switch in top view. Fig. 12, is a diagrammatic illustration of the electric circuits in this machine. Figs. 13, 14 and 15, illustrate in end view, and in vertical, and also in horizontal section, still another form of my dynamo, or motor, in which the magnetic switch is axially surrounded by a field coil. Figs. 16, 17 and 18, in end view and in vertical and horizontal section, illustrate another form of my dynamo or motor, in which the magnetic current switch, is longitudinally surrounded by a field coil. Fig. 19, illustrates one of my dynamos or motors, in which the magnetic current switch carries a field coil, and has its axis at right angles to the axis of the armature, the latter being shown in end view, the pole cheeks in section on a line at one side of its center and the switch or reverser and field coil, in central section. Figs. 20, 21, and 22, are other sectional views of the machine Fig. 19. Fig. 23, in end view, illustrates one of my dynamos or motors, having a magnetic current switch, which carries a field coil, and is axially mounted parallel with two armatures, one of which is applied to power service, and the other serves as a medium for cutting down the electric current when the motor is at rest. Fig. 24, in end view illustrates one of my motors having one armature and two magnetic current switches, each carrying a field coil, and a speed governor, for automatically controlling the switches. Fig. 25, is a side view of the same, a bracket, and a magnetic switch shaft, being broken away for better disclosing the gearing. Fig. 26, illustrates the shifting lever, by which the magnetic current switches are operated, and their connection with a worm shaft controlled by the governor. Fig. 27, illustrates the machine partly in plan view and partly in horizontal central section. Fig. 28, illustrates the electric connections and the magnetic circuits in this machine. Figs. 29 to 32, inclusive, illustrate the application of governing mechanism to motors organized as illustrated in Figs. 19 to 22. Fig. 33, illustrates the electric connections, for the armature and magnetic current switch. Fig. 34, illustrates the short circuiting of one of the armatures, of a machine similar to that shown in Fig. 23.

I will first describe the machine illustrated in Figs. 1 to 6, inclusive, because it will readily enable a comprehension of the main features of my invention. Moreover, this form of machine was developed from the same line of conceptions and experiments, which results in the production of the magnetic gage disclosed in my Letters Patent No. 413,338, dated October 22, 1889. In my said patent I disclosed a novel electric generator somewhat similar in structure to the machine now to be described, and my said before disclosed generator with its peculiar magnetic system and a galvanometer, constitutes the most sensitive of any of the several forms of magnetic gage, devised by me. The armature A, of this machine has an iron core, and need not be unlike ordinary drum armatures, and its communicator $a$, and its brushes, may be of any form adapted to use with reversible motors. The magnetic field system of this machine, includes a field coil B, which peripherally surrounds the armature centrally, and it directly polarizes the core of the armature. The armature is surrounded by four separate masses of iron C, C', C², C³, said iron serving as a conductor for the field magnetic circuit. Each of these masses, embodies or affords a concave cheek piece $b$, conforming to appropriate portions of the armature, and each has a laterally projecting cylindrical hub $b'$, as shown in connection with the mass C, the others being counterparts thereof. These four hubs $b'$, are connected by an iron bridge piece D, the latter having at its four corners, portions which partially conform to the outer ends of said hubs, and said bridge and these hubs, may be either integral, or constructed separately and then bolted together. The bridge piece D, is centrally recessed to afford a circular chamber $d$, the walls of which, at points between the hubs, in vertical and horizontal planes are quite thin, as at $d'$, the latter being the connecting portions, between the four main portions of the bridge piece. The outer front surface of the bridge piece, is annularly grooved as at $d^2$, to afford a seat for the flange of a non magnetic circular plate $e$, and at the inner end of the chamber $d$, there is a similar smaller plate $e'$, these serving merely as supports or brackets, for journal bearings. These bracket plates are clearly indicated in Figs. 2 and 3, but they are removed from Fig. 1, for better disclosing the interior of the chamber, and the presence of what I have termed the magnetic current switch E, which may also be termed a magnetic current reversing switch. It will be obvious that the field coil B, will cause the magnetic current, to flow in the armature core, say, for instance, from N to S, as indicated at or near the two ends of the armature; and also that the concave cheeks, and the hubs C, and C³, will be a part of the magnetic circuit, as well as the cheeks, and hubs C', C². Under these conditions, the magnetic field is of course neutralized, so far as relates to a capacity for inducing rotation of the armature, or for generating an electric current. The magnetic circuit in this machine, when neutralized, is divided into two circuits, as illustrated in Fig. 6, each traversing the armature core in parallel lines, and one of them, passes from one of the lower cheek pieces to the other. The other circuit passes from one to the other of the upper cheek pieces. The magnetic switch E, is a mass of iron rotatively mounted on an axis $f$, having its support in the bearings $e^2$, and having at its outer end, a handle $f'$. In one sense, this switch, or magnetic reverser, is a "keeper" for connecting the hub ends of the cores of this complex electro magnet. In its best form, this magnetic switch, is composed of thin soft iron plates $g$, insulated from each other, solidly connected, and firmly mounted on its axis, the plates being substantially parallel therewith, and their massed edges are rounded, to afford surfaces quite closely conforming to the interior of the chamber $d$. In the position shown in Fig. 1, the switch directly connects the upper right hand, pole cheek C' with the lower left hand cheek, and hub C², and therefore an effective magnetic circuit will be developed, (as indicated in Fig. 4,) from the upper right hand cheek piece, to one end of the armature core, thence to its other end, thence to the lower cheek piece C², and thence through the reverser or switch E, to cheek piece C', thus providing for such opposite polar conditions, as are requisite for inducing rotation of the armature in one direction. If now the switch E, be turned so that its handle $f'$, will be vertical, the four cheek pieces will be practically coupled, and two (neutralizing) circuits fully developed as illustrated in Fig. 6. If the magnetic switch be turned still farther toward the left hand, the cheek C, will be connected with the cheek C³, which will develop a magnetic circuit say from C, to, and longitudinally through the armature core, to the cheek C³, through the magnetic switch E, as indicated in Fig. 5, thus providing for a polar condition, and a reversed magnetic circuit, which will induce rotation of the armature, in a direction opposite to that before described. In any intermediate position only a part of the magnetism will pass through the armature in vertical direction, and therefore the speed of the motor will be increased, or the potential of the dynamo decreased. The thin portions of the bridge piece at $d'$, serve to secure a uniform magnetic field to enable the magnetic reverser, or switch E, to be quite easily moved on its axis, and this latter result is further assured, by constructing the switch of thin plates of iron, in that the magnetic resistance laterally through the plates is much greater than in parallel lines. With the handle $f'$, in the vertical position, all the four cheeks C, C', C², C³, are carrying magnetism, and the magnetic resistance of this part of the magnetic circuit is essentially decreased, and therefore, to keep the magnetic resistance uniform, when the switch E, is in this position, the magnetic resistance of the switch, is accordingly increased.

A machine is illustrated in Figs. 7 to 12, in which the armature A, is (as before described) of the drum form, its bearings being in suitable brackets, firmly bolted to a central heavy mass of iron, chambered at its upper portion to receive the armature, and afford cheek pieces C, and C', and similarly chambered below, to receive the magnetic switch E'. This magnetic switch, carries a field coil B'. In form it resembles a Siemens H armature, the coil being well inclosed at its sides, by overhanging portions of the core. The shaft $f$, of this magnetic switch, is parallel with the armature shaft, but as before described, it has a handle $f'$, the latter having a counterweight, just sufficiently heavy to balance any inequalities in the magnetic pull on the magnetic switch during its motion. In this machine, the armature is longitudinally, and diametrically, surrounded by an auxiliary field coil $h$, which may be termed a counterfield coil, the sides of which occupy suitable grooves in the cheek pieces C, and C', as clearly indicated in Figs. 8 and 10. This machine is adapted for service in an arc light circuit, and as shown in Fig. 12, the current enters the armature circuit at one brush, and leaving at the other, enters the auxiliary field coil $h$, and from thence passes to and through the field coil B', on the magnetic switch E'. It will be readily understood that the terminals of the coil B', have sufficient length between the coil, and suitable screw posts, to enable the magnetic switch to be rocked axially, without straining the wire, which can of course be readily bent to, and fro, and especially when it is developed into a few convolutions or coils, to secure flexibility, in a manner well known.

Referring now to Fig. 8, it will be assumed, that the coil B', will induce in the core of the switch, a magnetic current in the direction N to S, as indicated thereon; and that the magnetic switch is in the position shown, with its handle on the stop pin $f^2$, (Fig. 7) and in the line similarly designated. Under these conditions, the magnetic flow will be from S on the switch core to N at the base of the pole cheek C; and on the other side, said flow will be from S, at the opposite cheek C', to N, on the switch core, the magnetic circuit current flowing or passing upwardly from the magnetic switch through the cheek C, and the armature, to the cheek C', and thence downwardly, and back through the core of the magnetic switch, thus causing the motor to be driven in one direction. If now, the magnetic switch be turned toward the left hand, with the handle resting on the pin $f^2$, and on the line $f^3$, Fig. 8, the magnetic circuit will be reversed, it then passing from the switch core, through pole cheek C', to, and through the armature, and thence by way of pole cheek C, downward to, and through the switch core, thus causing the motor to be driven in a direction, opposite to that before described. While moving the magnetic switch from one of these positions to the other, the motor is promptly stopped, and as promptly started, and of course when the core of the magnetic switch is in a vertical position, the armature will be maintained at rest, because the two cheeks are magnetically neutralized by the switch, and even that part of the magnetism which would then pass through the armature, would flow in a vertical direction, and could not induce any electro motive force. The magnetic switch having, for instance, its N. side in line with the vertical diameter of the armature, will develop a correspondingly vertical magnetic flow in the armature core, and therefore induce electro motive force in those upper and lower armature coils which are short circuited under the brushes, and this would cause objectionable sparking at the commutator, if not properly counteracted. This is prevented by neutralizing the power of said vertical flow as follows: The magnetic current is delivered to, and passes through the armature circuit, in such a direction as to develop N polarity at the lower side of the armature core; and hence the magnetic flow induced thereby, will be opposite in direction, to that of the magnetic flow emanating from the magnetic switch. This in some cases may be ample in its neutralizing effect, but to secure a more complete neutralizing effect, the auxiliary coil $h$, receives current always in such a direction, as will cause a reinforced downward magnetic flow, and so strengthen or weaken (as the case might be), the N polarity at the lower side of the armature, that it will equal the N polarity of the upper side of the field coil, and counteract and entirely balance it, so that no objectionable electro motive forces will be induced, in those armature coils which are short circuited under the brushes.

In Figs. 13, 14 and 15, I illustrate a form of motor embodying my invention, in which the magnetic switch is surrounded by a field coil, which may be stationary as shown, or it may be axially movable with the magnetic switch, because it could not in either case, vary in its inductive operation, either with respect of the armature, or of the switching metal in the magnetic switch. It is, however, preferable in this form of machine, that the field coil be stationary, because then the magnetic switch will not only have less weight to carry, but be more easily rocked upon its axis. In this case, the mass of iron serving as a frame, and with its pole cheeks C, and C', is similar to that in Fig. 8, but the magnetic switch does not carry the field coil $B^2$, which is in form like the coil B, of Fig. 1, but in this machine, it loosely encircles the large axis $f$, of the magnetic switch $E^2$, the latter having two oppositely arranged segmental pole arms, appropriately arranged at the sides of the field coil, so as to develop, for instance, N polarity in the arm $g'$, and S polarity in the arm $g^2$.

The periphery of the field coil, lies in close proximity to the periphery of the armature A, and therefore it appropriately polarizes its core. As seen in Fig. 13, the N pole arm $g'$ of the magnetic switch is located toward the right hand, and the S pole arm $g^2$, toward the left hand, and therefore the adjacent portion of the pole cheek C, is polarized N and the adjacent portion of the pole cheek C' is polarized S, and the magnetic circuit is from $g^2$, through C, thence through the armature to C', and thence to the pole arm $g'$, back to $g^2$ through the large axis $f$. If now the magnetic switch be turned one hundred and eighty degrees, the N pole arm $g'$, will connect with the pole cheek C, and the S pole arm $g^2$, with the pole cheek C', thus reversing the magnetic circuit, and by these reversals, causing the armature to be driven in either direction. If the magnetic switch be set with the center of its arms on a vertical line, passing through the axis of the armature, the magnetic circuit from, and to, the arms $g'$, and $g^2$, of the magnetic switch will be neutralized, so far as relates to its effect on the core of the armature, because both pole cheeks will be exposed to polarity N, and in like manner to polarity S, by the S arm $g^2$. If the magnetic switch be set in an intermediate position, between the vertical, and the horizontal position, the motor will run either the one way, or the other, but with decreased speed, because of the weakened field at the armature, so that this method of magnetic commutation not only allows reversal of the motor, but also variation of its speed.

In Figs. 16, 17, and 18, I show a motor, which, unlike the one last described, has its field coil $B^3$, rectangular in form, and its sides are located in recesses at each side of the chamber which contains the magnetic switch $E^3$, thus locating the latter within the field coil, which, in this instance, must be stationary. With an electric current in said coil which will constantly induce a magnetic circuit affording N polarity in the upper portion of the magnetic switch, and S polarity in the lower portion, it is obvious, that when the magnetic switch has been turned toward the right hand, on the line $f^2$, as shown in Fig. 16, the pole cheek C, will be N, at its base and a magnetic circuit will be established say from the lower portion of the cheek piece C, to and across the armature core to C', and thence down to the upper portion of the magnetic switch, and downward through it, thereby inducing rotation of the armature in one direction. With the magnetic switch swung to the left hand position, as indicated, to line $f^3$, the magnetic circuit will be reversed, and provide for operating the motor in a direction opposite to that last described.

The motor shown in Figs. 19, to 22, inclusive, embodies a field coil $B^4$, which resembles that in Fig. 16, but in this case, it is mounted on, and is carried by the magnetic switch $E^4$. In this machine, the axis or shaft $f$, of the magnetic switch, is at right angles to the shaft of the armature A, and the machine, like the others already described, involves a practically uniform magnetic resistance. As seen in Fig. 21, the upper portion of the magnetic switch is polarized N and the lower portion S. The pole pieces in this machine are each separated into sections by a slot $i$, having diverging sides, to afford by the resulting air spaces, an effective magnetic resistance, and dividing the two pole pieces into four sections C, C', $C^2$, $C^3$. When the magnetic switch is in the position shown in Figs. 19 and 21, the pole cheeks C, C', will be polarized N at the armature, the magnetic circuit, then passing across through the core of the latter from the cheeks $C^2$, $C^3$, and thence to the upper side of the magnetic switch, thus providing for driving the motor in one direction. If the magnetic switch be rotated ninety degrees toward the right hand Fig. 21, then sections C, and $C^2$, will be polarized N, at the armature, the section $C^2$, having been reversed, from S to N, which will be equally true of section C', changed from N to S. In this position, the magnetic circuit will be divided, and neutralized as to its motor driving power, one half passing by way of the armature core from C, to C', and from $C^2$ to $C^3$. On further rotating the magnetic switch in the same direction, the sections $C^2$ and $C^3$ will be polarized N, at the armature, and sections C, and C', polarized S, thus reversing the magnetic circuit for driving the motor in a direction, opposite to that first described. This machine somewhat resembles the machine Fig. 1, with respect of the sectional pole cheeks, and the relative arrangement of the axes of the armature and magnetic switch. In that machine, constancy in the magnetic resistance for all positions of the switch, is afforded by the laminated iron in the magnetic switch, and in this machine, the magnetic pull on the magnetic switch is equalized, because of the equalizing of the magnetic field, during the rotation of the magnetic switch, by means of the gaps $i$. These motors are adapted to be operated by an electric current of constant strength, and when they are to be operated in a constant potential circuit, provision should be made against heavy short circuiting current, whenever the magnetic switch is placed in its neutral position.

In Fig. 23, I show a reversible motor adapted to be operated in a constant potential circuit. In this machine, there are two armatures A, and A', which are connected in series. The armature A, is the one which performs the working service required of the motor. The other armature A', runs without load, and when exposed fully to the magnetic circuit, its rotation rises to such speed, as to decrease the electric current passing through its coils, by the counter electro motive force which it develops, said current at times, being only just sufficient in driving power, to enable it to overcome the friction of the armature journal bearings. This magnetic switch $E^5$, is similar in form to that last described in connection with Fig. 19, but it is within a chamber symmetrically located with reference to both armatures. With the magnetic switch set on line $f^2$, the armature A, gets the effect of the entire magnetic circuit, and the armature A′, gets none, but stands at rest, while the armature A, performs its working duty. If the magnetic switch be rotated toward the left hand, to the vertical line $f^3$, a part of the magnetism will be supplied to the armature A′, and set it in motion, the magnetism to armature A, having been correspondingly diminished. When the magnetic switch has been moved to the position of line $f^4$, the armature A will get no magnetism, and will therefore stop, but then the armature A′, will be receiving all of the magnetism, and will be driven at such speed that its counter electro motive force will almost shut off the current. When the magnetic switch has been further moved to the position of line $f^5$, both armatures will be magnetized, and when the magnetic switch has been further moved in the same direction into its original position on line $f^2$, its polar relations will have been reversed, and consequently the armature A, will be driven in a direction opposite to that before described, the armature A′ then remaining at rest. With this machine, an electric switch operated by the magnetic switch, may be employed for short circuiting the armature A′, while the motor armature A is in service, so as to avoid the loss of energy due to the electric resistance in the armature A′, as will be hereinafter further described.

In Figs. 24, to 28, inclusive, I show a reversible motor having a centrifugal governor F which governs the speed of the motor, by varying the position of the magnetic switches. In this machine, the armature A, is located between two magnetic switches $E^6$, $E^7$. These magnetic switches carry field coils, and are similar to that in Fig. 7. The shaft $f$, of the magnetic switch $E^6$, has an arm $k$, and the shaft of the magnetic switch $E^7$, has an arm $k'$, which is connected, in a plane below its axis, to the arm $k$, above its axis, by a link $k^2$, which has a wide curved slot, enabling it to loosely embrace the bushing of the armature shaft, as clearly indicated. The magnetic switches being thus coupled, may be rocked simultaneously, but in opposite directions. The shaft $f$, of the magnetic switch $E^6$ at its outer end, has a segmental gear toothed arm $f^6$ having thereon a hand lever $f'$. The worm $l$, on a shaft $l'$, engages with the segmental gear arm. This shaft $l'$, is mounted in a light horizontal frame $l^2$, pivoted at its inner lower end at $l^3$, to the frame of the machine, and provided at its outer end, with a pendent thumb latch $l^4$, which engages with a keeper pin $l^5$, projecting laterally from the frame as shown in Figs. 24 and 26. With the worm shaft thus mounted, it can be lifted from the segmental gear, and leave the magnetic switch free to be moved by hand, for stopping or reversing the motor, and upon the dropping of the frame, the worm will be firmly reset on the segmental gear in its operative position. Upon the inner end of the worm shaft $l'$, a friction pulley $m$, is secured, so that rotative motion may be imparted to said shaft in either direction, by the horizontal revolving disks $m'$, $m^2$, which are mounted upon the sleeve $n$, of a governor shaft $n'$, driven by suitable beveled gearing from the armature shaft. A pair of ball arms at F are coupled in a manner well known, and common in centrifugal governors, to said shaft $n'$, and to the sleeve $n$, so that as a result of unduly high speed, the balls will be lifted, and they, lifting the lower disk $m^2$, will cause it to rotate the worm shaft in a proper direction to enable the magnetic switches to reduce the speed of the motor. So also, when the speed unduly decreases, and the balls descend, the upper disk $m'$, will then rotate the worm shaft in the opposite direction, and cause the magnetic switches to increase the speed of the motor.

Referring to Fig. 28, it will be seen that the electric circuit passes through the field coil of the magnetic switch $E^7$, thence through the armature, and thence through and from the field coil of the magnetic switch $E^6$. In the positions shown on the lines $f^2$, the upper and lower portions of both magnetic switches are respectively polarized N and S, thus inducing N polarity in the pole cheek C, at the armature and S polarity in the pole cheek C′, for causing the armature to be driven in one direction. If the magnetic switches be simultaneously rotated toward each other, the speed of the motor will be promptly diminished, and the motor will be stopped, when the magnetic switches reach the line $f^4$. Continued rotation of the magnetic switches in the same direction to lines $f^3$ will cause the motor to start in a direction opposite to that before described, and when the magnetic switches again occupy the lines $f^2$, their poles will have been reversed, the pole cheek C, then being of S polarity, and the pole cheek C′, of N polarity, and with the motor then reversed, and in full operation.

With some of my motors, the reversing operation can be effected at any time without disturbing the governor.

In Figs. 29 to 33 inclusive, I illustrate the application of a governor to the form of my motor already described in connection with Figs. 19 to 22. As before indicated, the pole cheeks in this machine, are divided into sections separated by the inclined sided slots $i$, so as to equalize the magnetic pull on the magnetic switch $E^4$, and enable it to be readily controlled by a centrifugal governor. The governor F is driven by means of a belt $p$, and pulleys $p'$, $p^2$, the latter being on the armature shaft. The lifting and depressing action of the ball arms, is communicated to a horizontal lever $p^3$, fulcrumed at one end, and pivoted at the other end to a pendent link $p^4$, which is flexibly connected at its lower end, to the outer end of a horizontal shaft $p^5$, having a sleeve at its inner end loosely mounted on the shaft $f$, of the magnetic switch. At the outer end of the shaft $f$ there is a grooved hand wheel $q$, secured on the hub of a loose beveled gear $q'$, and provided with an endless cord, or hand line $q^2$, which by passing over a knob or stud (not shown) will be under sufficient friction to cause the beveled gear $q'$, to be normally non rotative, but readily rotative when hand power is applied, either directly to the hand wheel, or to the hand line. Facing the gear $q'$, there is another beveled gear $r$, keyed upon the shaft $f$, and between these gears there is a third beveled gear $r'$, loosely mounted on the shaft $p^5$, and always meshed with the other two gears. In operation, the lifting and the depressing action of the bell arms, will cause a corresponding movement of the outer end of the shaft $p^5$, and the gear $q'$, being stationary, it will cause such a rotation of the gear $r'$, as will in turn cause the gear $r$, and the magnetic switch, to be appropriately operated, for controlling the speed of the motor. The electric connections between the armature A, and the magnetic switch $E^4$, are illustrated in Fig. 33, they having been omitted in connection with this form of motor, previously described.

In connection with the two armature machine Fig. 23, I have referred to short circuiting one of the armatures under certain conditions, as will now be explained in connection with Fig. 34. The armature A, and A', as well as the magnetic switch $E^5$, are as before described, but on the axis of said switch, there is an arm $s$, carrying at one end a lateral conducting bar $s'$ which when in operative position, couples the contact plates $s^2$ and $s^3$. When the arm $s$, occupies a position on line $f^2$, the two contact plates $s^2$, and $s^3$, will be coupled by the bar $s'$, as shown, so that the current will then be short circuited from the armature A', but when the switch arm occupies either of the other lines, the armature A', will be in circuit.

It will be observed, that all of the machines herein described, involve in their use, the same novel method of reversely operating electric motors, viz: by switching magnetic circuits, and changing their direction with respect of the armature, without in any manner changing the electric connections, and also without changing the strength of said magnetic circuits, and that all of said motors in their variable operation, will involve no variations in the electric circuits, from which they are supplied; and further, it will be seen that my novel method of controlling the speed of electric motors by switching the magnetic current so that its flow will vary as to the direction of portions thereof into and from its most effective path, is also involved in the use of all of the machines described.

Considering a motor to be at rest, its adjustment for operation in either direction, involves substantial novelty, in that first, the several electric connections are set in a fixed, and non variable condition, and then the direction of the magnetic flow, to, and from the armature, is predetermined by adjusting axially, a mass of metal which is occupied by the magnetic circuit, and serves as a reversing magnetic switch. This is best illustrated by assuming, that the magnetic switch has been removed from the machine Fig. 1, together with the bridge piece leaving the four pole hubs, exposed, and disconnected. The electric connections are then adjusted, regardless of the direction of current, and without reference to the direction in which the motor is to be driven. Now by placing a bar of iron diagonally on either two of the hubs, the motor will be driven in a direction appropriate to that adjustment, and the magnetic switches in either of the forms shown, will involve simple axial variations in position, for causing them to operate like the bar of iron referred to, in predetermining the direction in which the motor, will be driven, regardless of the direction of the electric currents supplied to the machines.

Although all of the machines illustrated are "bipolar," it is to be understood, that I also apply my invention to multipolar machines, the switches in the latter being mechanically coupled, so that they will all be moved in harmony, after the manner illustrated in Fig. 24, and I also apply my invention to machines having disk armatures, with or without iron cores.

It is to be understood, that some of the machines herein disclosed involve many novel features of substantial valve, which cannot herein be appropriately claimed, and therefore said features will be made, in whole, or in part, the subjects of subsequent applications for Letters Patent.

Having thus described my invention, I claim as new and desire to secure by Letters Patent—

1. The method of operating reversible electric motors which consists, first, in constantly supplying an armature circuit, and a field magnet circuit of constant magnetic resistance, with electric currents unvaried as to direction, and adapted to drive a motor in one direction; and, secondly, mechanically switching the magnetic current and thereby reversing the direction of its flow with relation to an armature, without changing its strength, and causing the rotation of the armature to be reversed, without changing the direction of the electric current, either in the armature, or in the field coils.

2. The method of operating and controlling the speed of electric motors which consists in constantly supplying an armature circuit and a field magnet circuit with electric currents which induce non variable magnetism in a magnetic field; and, secondly, mechanically switching the magnetic current in said field, and thereby, without changing the strength of the magnetic current, as a whole, varying the direction of portions of said magnetic current with respect of the armature, and causing the motor to variably operate in proportion to the extent to which the magnetic current may have been diverted from, or directed into, its most effective path through the armature.

3. The method of adjusting electric motors for operation in either direction, which consists in adjusting all electric connections with the armature, and field coils, in a fixed or non variable condition for supplying electric currents unvariable as to direction, and then adjusting the direction of magnetic flow to and from the armature, by axially varying the position of a mass of iron occupied by the magnetic circuit, and thereby directing the magnetic flow toward the armature which will be required for causing the motor to be driven in the desired direction, without regard to the direction of the electric currents in their several circuits.

4. In a dynamo electric machine, the combination substantially as hereinbefore described, of an iron core armature, and its coils, and a magnetic system of constant magnetic resistance embodying suitable field coils, and separate masses of iron, one of which operates as a switch in the magnetic circuit, and the remainder affords appropriate pole cheeks for the armature, these parts being so organized, that the switch can, and will vary, and reverse the direction, of the magnetic current with respect of its passage through the pole cheeks, and thence through the core of the armature, and provide for operating a motor in either direction at different speeds, and for operating a dynamo with different electro motive forces, without any variation in the direction of the electric currents, in the circuits of the armature and field coils.

5. In an electric motor, the combination substantially as hereinbefore described, of an armature, a mass of iron affording pole cheeks appropriately located with reference to the armature, and a rotative field magnet, located within said mass of iron, and provided with a core, which when axially varied in position, will variably switch the magnetic flow, and cause it to pass from either pole cheek to the other, for driving the motor in either direction.

6. In an electric motor, the combination substantially as hereinbefore described, of an armature, field coils, and armature coils, supplied with electricity without variation in strength and direction of the current, the field coil current inducing a magnetic field which is non variable so far as relates to the results of said electric current; a movable mass of iron in the magnetic circuit which is afforded by masses of iron and said field coils; a centrifugal governor driven by said armature, and connected with said movable mass of iron, for varying the strength of the magnetic circuit with reference to its effect on the armature, but without varying the strength of the magnetic circuit as a whole.

7. In an electric motor, the combination substantially as hereinbefore described, of an armature; magnetic metal affording pole cheeks appropriately located with reference to the armature; an axially mounted field magnet located with reference to effectively polarizing said pole cheeks, and a centrifugal governor, driven by the armature, and connected with the field magnet, for varying its axial position, and the direction of its poles with relation to said pole cheeks, and thereby varying the working strength of the magnetic circuit in which the armature is located, and correspondingly controlling the motor, by causing it to operate with uniformity at any desired speed, without variation in the electric currents supplied to the armature, and to the field coil of the magnet.

8. In a reversible electric motor, the combination substantially as hereinbefore described, of means for affording an effective magnetic circuit of constant strength; a magnetic switch adapted to reverse or vary the direction of magnetic flow in said circuit, independently of the direction of the electric circuits; a centrifugal governor, driven in harmony with the motor, and detachably coupled to said magnetic switch, and means for reversing the switch, and thereby reversing the motor, and enabling the governor to control the speed of the motor regardless of the direction in which it may be driven.

9. In an electric motor, the combination substantially as hereinbefore described, of an armature; magnetic metal affording appropriate pole cheeks; a field coil for inducing an effective magnetic circuit; a magnetic switch in said circuit adapted to vary and to reverse the direction of the magnetic current with reference to said pole cheeks, and the armature; and an auxiliary field coil partially housed in said pole cheeks, and surrounding the armature longitudinally for inducing opposing magnetism in the armature core when said switch is located in its neutral position, and thereby preventing sparking at the commutator, during the stoppage of the motor preparatory to reversing it.

10. In an electric motor, the combination substantially as hereinbefore described, of an armature; magnetic metal affording at each side of the armature, pole cheeks divided into sections; a field coil adapted to induce a magnetic field, constant as to strength of flow in the magnetic circuit or circuits; a magnetic switch in said circuit, which is rotative on an axis, at right angles to the axis of the armature, whereby the switch may be adjusted for varying the polarity of each pole cheek, or of either section thereof, and thereby providing for regulating the speed of the motor, or for reversing it, without varying the electric currents either as to strength or direction.

11. In dynamo electric machines, the combination substantially as hereinbefore described, of appropriate windings of wire affording electric conductors for a field circuit, and for an armature circuit, and magnetic metal affording a conductor for the field magnetic circuit, a portion of said magnetic metal being movable and adapted to operate as a switch in the magnetic circuit for changing the direction of its flow with relation to the armature circuit, and thereby providing in a motor, for variations in speed and direction of motion, and in a generator, for variations in potential, without variations of current in the electric circuits, either as to strength or direction.

RUDOLF EICKEMEYER.

Witnesses:
CHAS. STEINMETZ,
H. RYDQUIST.